United States Patent [19]
Hildebrand

[11] Patent Number: 5,738,164
[45] Date of Patent: Apr. 14, 1998

[54] ARRANGEMENT FOR EFFECTING AN ENERGY EXCHANGE BETWEEN EARTH SOIL AND AN ENERGY EXCHANGER

[75] Inventor: Hans Hildebrand, Baar, Switzerland

[73] Assignee: Geohil AG, Hunenberg, Switzerland

[21] Appl. No.: 751,135

[22] Filed: Nov. 15, 1996

[51] Int. Cl.$^6$ .................................................. F28D 15/00
[52] U.S. Cl. .................................................. 165/45; 62/260
[58] Field of Search .................... 165/45, 142; 62/260

[56] References Cited

U.S. PATENT DOCUMENTS

| | | | |
|---|---|---|---|
| 4,372,386 | 2/1983 | Rhoades et al. | 165/45 X |
| 4,452,303 | 6/1984 | Bontje et al. | 165/142 |
| 4,492,083 | 1/1985 | McCabe et al. | 165/45 X |
| 4,741,388 | 5/1988 | Kuroiwa | 165/45 |
| 5,322,115 | 6/1994 | Hildebrand | 165/45 |

*Primary Examiner*—John Rivell
*Assistant Examiner*—Christopher Atkinson
*Attorney, Agent, or Firm*—Anderson, Kill & Olick, p.C.

[57] ABSTRACT

An arrangement for effecting an energy exchange between earth soil and an energy exchanger, and including a soil heat exchanger, and supply and return flow conduits for connecting the soil heat exchanger with the energy heat exchanger, with the soil heat exchanger having a thermoinsulated supply pipe arranged in a borehole formed in ground, a pump provided at an end of the flow duct, a shroud pipe surrounding the flow duct and the pump and having a section with a reduced inner cross-sectional area located beneath the pump and provided with a plurality of lateral inlet openings, and a return flow region for return water located radially outwardly of the shroud pipe and including return flow pipe means, connectable with the return flow conduit, and a porous filling, the return flow region communicating, in the vicinity of a borehole bottom, with an interior of the shroud pipe through the lateral inlet openings provided in the shroud pipe section with a reduced inner cross-sectional area.

12 Claims, 1 Drawing Sheet

U.S. Patent    Apr. 14, 1998    5,738,164
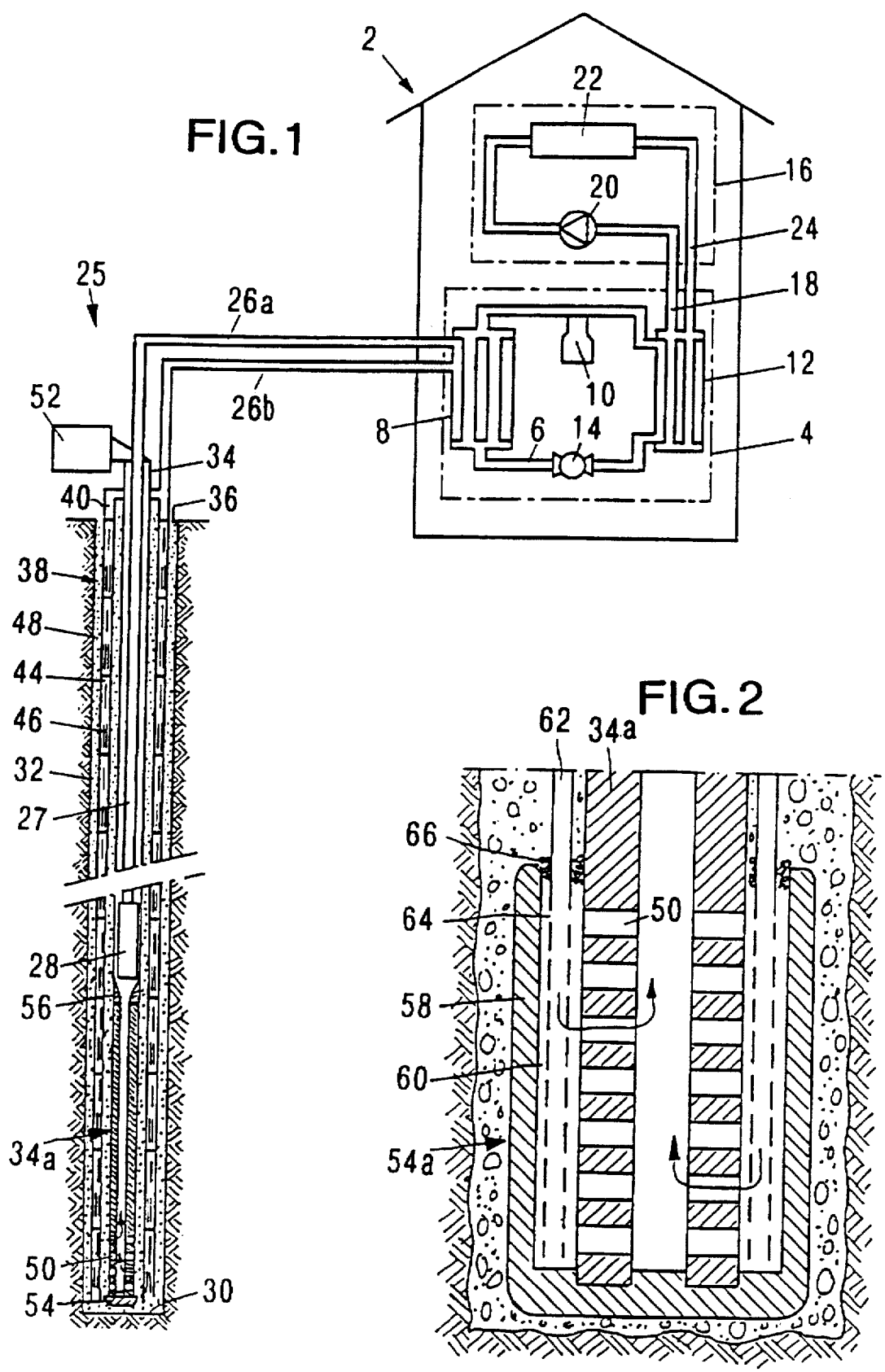

ARRANGEMENT FOR EFFECTING AN ENERGY EXCHANGE BETWEEN EARTH SOIL AND AN ENERGY EXCHANGER

BACKGROUND OF THE INVENTION

1. Field of the Invention

The present invention relates to an arrangement for effecting an energy exchange between earth soil and an energy exchanger and including a soil heat exchanger, and supply and return flow conduits for connecting the soil heat exchanger with the energy exchanger, with the soil heat exchanger having a thermoinsulated supply flow duct arranged in a borehole formed in ground, a pump provided at an end of the flow duct, a shroud pipe surrounding the flow duct and the pump and having a plurality of lateral inlet openings, and a return flow region for return water located radially outwardly of the shroud pipe and including return flow pipes connectable with the return flow conduit, and a porous filling, with the return flow region communicating, in a vicinity of a borehole bottom, with an interior of the shroud pipe through the lateral inlet opening provided in the shroud pipe.

2. Description of the Prior Art

Arrangements of the above-described type are generally known, and one is disclosed in European Patent No. 0386176. Such an open, i.e., pressureless system, in which the supply flow conduit and the return flow conduit do not form any closed conduit system, proved itself to be very good. However, when such an arrangement is used at substantial depths, high resistance is generated which substantially reduces the water flow velocity.

Accordingly, an object of the invention is an arrangement of the above-described type in which the water flow velocity is increased when the arrangement is used at a substantial depth.

SUMMARY OF THE INVENTION

This and other objects of the present invention, which will become apparent hereinafter, are achieved by providing an arrangement of the above-described type in which the shroud pipe has, beneath the pump, a section with a reduced inner cross-sectional area in which the lateral inlet openings are provided. The reduction of the inner cross-sectional area of the shroud pipe in this region permits to increase the heat-dependent raising velocity of the heated supply water which increases the output capability of the soil heat exchanger. The invention also permits the use of the soil heat exchanger at greater depths and permits to increase the depth from a depth of 250÷350 m, at which conventional soil heat exchangers are used, to 500÷800 m and deeper. The maximum depth depends primarily on the drilling equipment.

A further advantage of the present invention consists in that the pump need not be arranged at the lower end of the soil heat exchanger but only at a certain depth, which permits to save pipe material used for making the conduits and permits to repair, when needed, and service the pump much rapidly.

Forming of the shroud pipe section with a reduced inner cross-sectional area of a thermoinsulated material prevents heat transfer from the supply water to the environment. As a result, the raising velocity of the supply water is not reduced.

Basically, the return flow pipes are formed as described, e.g., in European Patent No. 0386176. By circulating the return water through the surrounding soil region, the heat transfer from the surrounding soil region to the return water can be increased.

Dependent on the geological characteristics of the soil, it can be advantageous to extend the return pipes up to the a lower end of the shroud pipe and to provide in the return pipes, in the region of the inlet openings of the shroud pipe, a plurality of through-openings. The heat transfer is effected in the region of closed return flow pipe by a local circulation of the environmental water, which is cooled down by contact with the return flow pipes and which is then heated by the region located radially outwardly of the return flow pipes.

Further, with the lower end of the shroud pipe being closed with a cap, the penetration of sediments or other impurities in the shroud pipe is prevented.

Providing a closure cap having a lateral annular wall, which surrounds the region of the shroud pipe with lateral inlet openings, prevents blocking of the openings with the soil material. The penetration of the sediments into the chamber, which is formed by the cap annual wall and the shroud pipe, is prevented by closing the open end of the cap with a filter. At that, the open, pressureless system remains.

In case, when the through-openings of the return flow pipes are provided in the region of the shroud pipe inlet openings, in particular in the region covered by the cap annular wall, it advantageous to form the filter as a sieve. It is advantageous when the return flow pipes cover a major portion of the shroud pipe circumference. The diameter of a return flow pipe can be equal 9 mm, with the wall thickness of 1 mm.

BRIEF DESCRIPTION OF THE DRAWINGS

The objects and features of the present invention will become more apparent and the invention itself will be best understood from the following detailed description of the preferred embodiment when read with reference to the accompanying drawings, wherein:

FIG. 1. shows a vertical cross-sectional schematic view of an arrangement for effecting an energy exchange between earth soil and an energy exchanger according to the present invention; and FIG. 2. shows the ground region of a modified arrangement according to the present invention.

DETAILED DESCRIPTION OF THE PREFERRED EMBODIMENTS

FIG. 1 shows an arrangement for using the earth heat, e.g., for heating a house 2. The house heating system includes an energy exchanger which is formed, e.g., as a heat pump 4 the medium circulation circuit 6 of which includes an evaporator 8, a compressor 10, a condenser 12, and a flow control valve 14. The condenser 12 is connected with a heating apparatus 16, which includes a heat consumer 22, by a heat supply conduit 18 provided with a circulation pump 20. A return conduit 24 is provided between the heating apparatus 16 and the condenser 12.

The evaporator 8 is connected with a soil heat exchanger 25 by a supply conduit 26a and a return conduit 26b. The soil heat exchanger includes a thermoinsulated supply flow pipe 27 and a pump 28 which is spaced from the bottom 30 of a borehole 32 in which the soil heat exchanger is arranged.

A shroud pipe 34 surrounds the supply flow pipe 27 and the pump 28. The wall 36 of the borehole 32 and the outer circumference of the shroud pipe 34 define together a return flow region 38. The return flow region 38 includes a plurality of return flow pipes 40, which are arranged along a circle and communicate with a return flow conduit 26b which is connected with the evaporator 8.

As shown in FIG. 1, each return flow pipe 40 extends up to the bottom 30 of the borehole 32 and contains a plurality of transverse seals 44 distributed along its length. On both sides of the seals 44, there are provided through openings 46. The openings 46 provide for flow of the return water in a porous filling 48 which fills the return flow region 38 and surrounds the return flow pipes 40. The openings 46 can be formed, e.g., as elongated slots. A return flow pipe 40 contains, along its length, several rows of openings 46.

The porous filling 48 advantageously is formed of gravel. In the region of the bottom 30 of the borehole 32, the return flow region 38 communicates with the interior of the shroud pipe 34 via inlet openings 50 provided in the shroud pipe 34. A scavenging pump 52 is provided at the upper end of the shroud pipe 34. The scavenging pump 52 provides for entry of the return water through the inlet opening 50 into the interior of the shroud pump 34 in the return flow region and prevents or at least substantially reduces a possible mud accumulation in the porous filling 48. The lower or bottom end of the shroud pipe 34 is closed with a protective cap 54.

As shown in FIG. 1, the supply flow duct 27 and the pump 28 do not reach the lower end of the shroud pipe 34 but extend over a region of, e.g., 200+350 m. Beneath the pump 28, the shroud pipe 34 passes into a section 34a having a smaller inner cross-sectional area than the upper region of the shroud pipe 34. The transitional region is formed by a reducing adapter 56. The section 34a of the shroud pipe 34 is formed as a thermoinsulated section formed, preferably, of a per se know thermopipe having a correspondingly bigger wall thickness. Such a thermopipe is formed, e.g., of a plastic material and includes a plurality of air-filled chambers which reduce heat transfer.

The shroud pipe section 34a with a reduced inner cross-sectional area can extend to a depth of, e.g., 200–800 m and even deeper.

FIG. 2 shows a modified structure of the end region of the soil heat exchanger in which the protective cap 54a has a lateral annular wall 58 which, in the region of the lower end of the shroud pipe section 34a, overlaps the inlet openings 50 of the shroud pipe. The annular wall 58 forms, together with the shroud pipe section 34a, a chamber 60 into which the return flow pipes 62 open. The return flow pipes 62 have a smaller cross-section, and there is provided a such number of them that they cover at least the major portion of the circumference of the shroud pipe section 34a.

The return flow pipes are formed preferably of a heat conducting material, e.g., of copper. The return flow pipes 6 extend up the bottom of the protective cup 54a and have, in the region of the chamber 60, through-openings 64. The heated return water exits through the openings 64 and flows through the inlet openings 50 of the shroud pipe section 34a into its interior. The upper region of the annular chamber 60 is closed preferably by a filter 66 formed, e.g., as a sieve or the like. The filter 66 prevents penetration of sediments, while insuring communication between the chamber 60 and its surrounding to provide an open system.

Through the present invention was shown and described with a reference to a preferred embodiment, various modifications thereof would be apparent to those skilled in the art and, therefore, it is not intended that the invention be limited to the disclosed embodiment and/or details thereof, and departure therefrom can be made within the spirit and scope of the appended claims.

What is claimed is:

1. An arrangement for effecting an energy exchange between earth soil and an energy exchanger, the arrangement comprising:

a soil heat exchanger; and supply and return flow conduits for connecting the soil heat exchanger with the energy exchanger, wherein the soil heat exchanger comprises:

a thermoinsulated supply flow duct arranged in a borehole formed in ground;

a pump provided at an end of the flow duct;

a shroud pipe surrounding the flow duct and the pump and having a section with a reduced inner cross-sectional area located beneath the pump and provided with a plurality of lateral inlet openings; and a return flow region for return water located radially outwardly of the shroud pipe and including return flow pipe means, connectable with the return flow conduit, and a porous filling, the return flow region communicating, in a vicinity of a borehole bottom, with an interior of the shroud pipe through the lateral inlet openings provided in the shroud pipe section with the reduced inner cross-sectional area.

2. An arrangement according to claim 1, wherein the shroud pipe section with the reduced inner cross-sectional area is formed as a thermoinsulated section.

3. An arrangement according to claim 1, wherein the return pipe means extends up to a lower end of the shroud pipe and has, at least in region of the inlet openings of the shroud pipe, a plurality of through-openings.

4. An arrangement according to claim 1, wherein lower end of the shroud pipe is closed with a protective cap.

5. An arrangement according to claim 4, wherein the protective cap overlaps at least a region of the shroud pipe provided with lateral inlet openings, and forms, together with the shroud pipe region, a chamber.

6. An arrangement according to claim 5, wherein the chamber is formed as an annular chamber surrounding the shroud pipe.

7. An arrangement according to claim 5, wherein the chamber is closed with a filter for preventing penetration into the return flow region of surrounding materials.

8. An arrangement according to claim 7, wherein the filter is formed as a sieve.

9. An arrangement according to claim 5, wherein the return flow pipes means cover at least a major portion of a shroud pipe circumference.

10. An arrangement according to claim 1, wherein the return flow pipe means are form of a heat conducting material.

11. An arrangement according to claim 1, wherein the supply and return flow conduits are made from copper.

12. An arrangement according to claim 1, wherein the return flow pipe means comprises a plurality of pipes having a diameter of about 9 mm and a wall thickness of 1 mm.

* * * * *